Dec. 14, 1971   J. G. TROY   3,626,550
ELECTRICAL SHOCKING DEVICE FOR A HIDE PULLER APPARATUS
Filed July 30, 1970
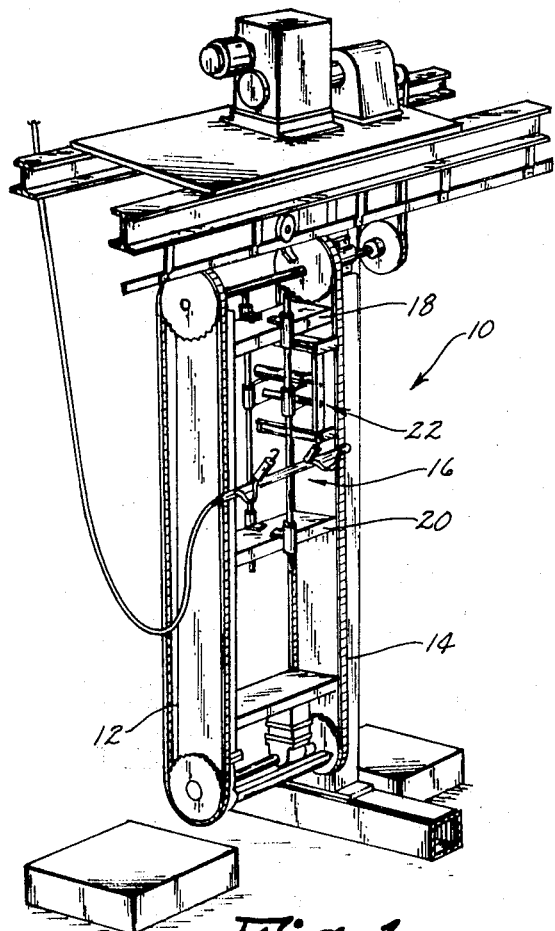
Fig. 1
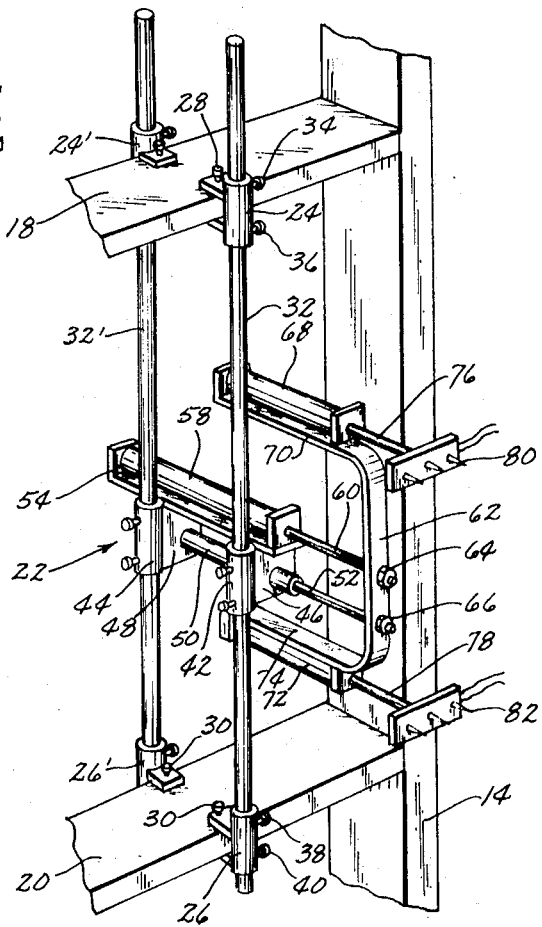
Fig. 2
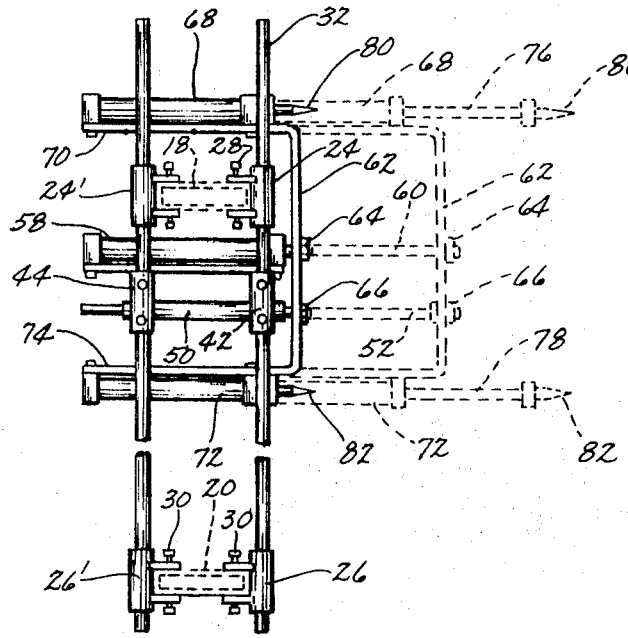
Fig. 3
Fig. 4
INVENTOR
JOHN G. TROY
BY
Zarley, McKee & Thomte
ATTORNEYS

United States Patent Office 3,626,550
Patented Dec. 14, 1971

3,626,550
ELECTRICAL SHOCKING DEVICE FOR A HIDE
PULLER APPARATUS
John G. Troy, 8401 W. Dodge Road, Suite 111,
Omaha, Nebr. 68102
Filed July 30, 1970, Ser. No. 65,292
Int. Cl. A22b 5/16
U.S. Cl. 17—21                                    4 Claims

ABSTRACT OF THE DISCLOSURE

An electrical shocking device for use with a hide puller apparatus comprising a support means mounted on the frame of the hide puller apparatus and having a power cylinder means mounted thereon with a movable cylinder rod extending therefrom. An electrode means is mounted on the outer end of the extendible rod and may be selectively moved into contact with the spine of the carcass suspended adjacent the hide puller apparatus to stiffen or firm the carcass for the hide pulling operation.

---

Hide puller or removal devices such as that disclosed in United States Letters Patent No. 3,479,686 has revolutionized the hide pulling operations which were formerly performed manually. The device of said patent exerts a tremendous pulling force on the hide of the carcass to strip the same therefrom. However, it has been found that the hide puller devices can and will damage the spine of the carcass due to the tremendous force exerted thereon especially when the hide is being stripped from the shoulder, neck and head areas. Damage to the spine can be prevented by momentarily imposing an electrical shock into the spine area of the carcass to firm or stiffen the carcass to prevent damage to the spine. The instant invention pertains to an automatic electrical shocking means which may be mounted on the frame of the hide puller apparatus to provide a convenient and efficient means for imposing the electrical shock into the spine of the carcass.

It is a principal object of this invention to provide an electrical shocking means for use with a hide puller apparatus.

A further object of this invention is to provide an electrical shocking means for use with a hide puller apparatus such as that disclosed in United States Letters Patent No. 3,479,686.

A further object of this invention is to provide an electrical shocking means for use with a hide puller apparatus including a power cylinder means adapted to move an electrode means into contact with the spine of the carcass suspended adjacent the hide puller apparatus.

A further object of this invention is to provide an electrical shocking means for use with a hide puller apparatus which is convenient to use.

A further object of this invention is to provide an electrical shocking means for use with a hide puller apparatus which imposes an electrical shock into the carcass to prevent damage to the spine thereof during the hide pulling operation.

A further object of this invention is to provide an electrical shocking means for use with a hide puller apparatus which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specially pointed out in the claims, and illustrated in the accompanying drawings in which:

FIG. 1 is a perspective view of a hide puller apparatus having the device of this invention mounted thereon.

FIG. 2 is a perspective view of the device of this invention.

FIG. 3 is a side view of the device of this invention, the broken lines indicating the extended position of the power cylinders and electrode means; and FIG. 4 is a side view depicting the hide being stripped from a carcass with the shocking means of this invention being used on the carcass.

The numeral 10 generally designates a hide puller apparatus such as that disclosed in United States Letters Patent No. 3,479,686 dated Nov. 25, 1969, and that patent is relied on herein to complete this disclosure. The hide puller apparatus 10 includes generally a pair of spaced apart chain members 12 and 14 having a hide gripping means 16 secured thereto so as to strip the hide downwardly therefrom. Hide puller apparatus 10 includes a pair of spaced apart supports or frame members 18 and 20 to which the device of this invention is attached.

The numeral 22 refers generally to the electrical shocking means of this invention and is best seen in FIG. 2. Sleeves 24 and 26 are adjustably secured to the frame members 18 and 20 respectively by means of bolts 28 and 30 extending through lugs secured thereto and extending therefrom as seen in FIG. 2. Rod 32 is vertically adjustably mounted in the sleeves 24 and 26 and is maintained in various positions of its vertical movement by means of the bolts 34 and 36 threadably extending into the sleeve 24 and by means of the bolts 38 and 40 threadably extending into the sleeve 26. Rod 32' is vertically slidably mounted in the sleeves 24' and 26' as seen in FIG. 2.

Sleeves 42 and 44 are vertically adjustably mounted on the rods 32 and 32' respectively and have ears 46 and 48 secured thereto and extending therefrom respectively. Guide tube 50 is secured to the ears 46 and 48 by welding or the like as seen in FIG. 2 and has a guide rod 52 slidably mounted therein and extending therefrom. A power cylinder support 54 is secured to the ears 46 and 48 and has a power cylinder 58 mounted thereon. Power cylinder 58 includes a cylinder rod slidably extending therefrom.

A U-shaped bracket 62 is secured to the outer end of rod 60 by nut 64. Guide rod 52 is secured to the bracket 62 by nut 66. Power cylinder 68 is secured to leg 70 of bracket 62 while power cylinder 72 is secured to leg 74 of bracket 62. Power cylinder 68 includes a cylinder rod 76 extending therefrom while power cylinder 72 includes a cylinder rod 78 extending therefrom. An electrode means 80 is suitably mounted on the outer end of rod 76 and is insulated therefrom by any convenient means. Electrode means 82 is suitably mounted on the outer end of rod 78 and is also insulated therefrom by any convenient means. Electrodes 80 and 82 are electrically connected to a source of electrical current which is preferably 12 or 14 volts. The power cylinders 58, 68 and 72 may be either of the pneumatic or hydraulic types with the pneumatic type being preferred. The power cylinders 58, 68 and 72 are operatively connected to a source of pneumatic or hydraulic pressure and suitable control means therefore so as to cause the cylinder rods 60, 76 and 78 to be moved from a withdrawn position to an extended position and vice versa.

In operation, the carcass 84 is positioned adjacent the hide puller apparatus 10 with the hide gripping means 16 being attached to the hide 86 of the carcass. The hide is stripped downwardly from the carcass 84 until the hide is approximately at the shoulder, neck and head area. At that time, the operator of the hide puller apparatus operates the control mechanism for the power cylinders 58, 68 and 72 so as to cause the extension of the rods 60, 76 and 78 therefrom to cause the electrodes 80 and 82 to be moved into engagement with the spine area of the carcass. The operator then actuates the control switch for the electrodes 80 and 82 so as to cause an electrical shock of 12 or 24 volts to be momentarily imposed into the spine area of the carcass so as to firm or stiffen the carcass. The operator then deactivates the electrodes 80 and 82 and operates the control means so as to cause the rods 60, 76 and 78 to be withdrawn into their respective cylinders so as to move the electrode means 80 and 82 inwardly behind the chains 12 and 14 to prevent damage thereto upon subsequent operation of the apparatus. The operator then actuates the hide puller apparatus to pull the hide from the shoulder, neck and head of the carcass. The electrical shock imposed into the carcass does stiffen or firm the carcass to prevent damage to the spine of the carcass during the final hide pulling operation. The electrical shocking means of this invention provides a convenient means for imposing that shock into the animal when a hide puller apparatus is being used. The control means for the power cylinders and electrode means does not form a part of this invention but such control means could be designed so that the operation of the power cylinders and electrodes is completely automatic in operation.

Thus it can be seen that an extremely convenient means has been provided for imposing an electrical shock into a carcass suspended for a hide pulling apparatus and that the invention accomplishes at least all of its stated objectives.

I claim:
1. In combination,
a hide puller apparatus including a frame means,
an electrical shocking means movably mounted on said frame means, said shocking means comprising an electrode means adapted to be moved into electrical contact with a carcass positioned adjacent said hide puller apparatus to firm the carcass for the hide pulling operation.
2. The combination of claim 1 wherein said shocking means comprises a power cylinder means having an extendible rod means mounted thereon, said electrode means being operatively connected to the outer end of said extendible rod.
3. The combination of claim 2 wherein said hide puller apparatus includes horizontally disposed frame member, said power cylinder means including a support means operatively secured to said frame member.
4. The combination of claim 3 wherein said hide puller apparatus includes a pair of spaced apart chain members having a hide gripper means mounted thereon, said power cylinder means being mounted between said chain members, said power cylinder means adapted to move said electrode means outwardly from between said chain members to cause said electrode means to engage the carcass.

References Cited
UNITED STATES PATENTS 3,479,686   11/1969   Troy _____ 17—21
3,537,130   11/1970   McDonnell _____ 17—50

LUCIE H. LAUDENSLAGER, Primary Examiner

U.S. Cl. X.R.

17—50